United States Patent
Zebolsky

Patent Number: 6,113,118
Date of Patent: Sep. 5, 2000

[54] CLOSED CELL FOAM INSERT FOR A KING PIN/KNUCKLE ARM ASSEMBLY

[75] Inventor: Michael L. Zebolsky, Marshall, Mich.

[73] Assignee: Dana Corporation, Toledo, Ohio

[21] Appl. No.: 09/163,556

[22] Filed: Sep. 30, 1998

[51] Int. Cl.⁷ ........................................ B60G 7/00
[52] U.S. Cl. ........................................ 280/93.512
[58] Field of Search ................ 280/93.512, 93.502

[56] References Cited

U.S. PATENT DOCUMENTS

| | | | |
|---|---|---|---|
| 1,391,692 | 9/1921 | Pugh . | |
| 1,681,870 | 8/1928 | Miller . | |
| 1,865,202 | 6/1932 | Milligan | 280/93.512 |
| 1,939,653 | 12/1933 | Bijur | 184/7 |
| 2,512,881 | 6/1950 | Smiley, Jr. | 308/120 |
| 2,752,178 | 6/1956 | Hoffman . | |
| 2,872,206 | 2/1959 | Cislo . | |
| 2,916,295 | 12/1959 | Sandberg . | |
| 2,998,262 | 8/1961 | Hoffman . | |
| 3,441,288 | 4/1969 | Boughner . | |
| 3,542,392 | 11/1970 | Cumming . | |
| 3,915,469 | 10/1975 | Vanice | 280/96.1 |
| 4,690,418 | 9/1987 | Smith | 280/96.1 |
| 4,915,530 | 4/1990 | Tomlinson | 403/158 |
| 5,022,673 | 6/1991 | Sekino et al. . | |
| 5,213,352 | 5/1993 | Chalin . | |
| 5,538,275 | 7/1996 | Lomnick . | |
| 5,722,784 | 3/1998 | Link | 403/158 |
| 5,975,547 | 11/1999 | Stroh | 280/93.512 |

*Primary Examiner*—Brian L. Johnson
*Assistant Examiner*—G B Klebe
*Attorney, Agent, or Firm*—Liniak, Berenato, Longacre & White

[57] ABSTRACT

A king pin connection between a vehicle steering axle and knuckle arm. The king pins are pivotally connected to either ends of an axle beam and pivotally connected to steering knuckles which in turn are connected to the wheels. Each king pin is rotatably mounted within a cylindrical bore on the steering knuckle and retained therein by a king pin cap disposed adjacent at least one end. A closed cell foam insert is disposed between the king pin and king pin cap. The insert is preferably axially compressed so that it may further compress and expand to substantially or nearly completely occupy the volume between the kingpin and kingpin cap. A grease fitting may be formed on the kin pin cap and a grease passage formed in the insert to facilitate lubrication.

6 Claims, 2 Drawing Sheets

CLOSED CELL FOAM INSERT FOR A KING PIN/KNUCKLE ARM ASSEMBLY

BACKGROUND OF THE INVENTION

1. Field of the Invention

This invention relates to a king pin/knuckle arm assembly for a steering mechanism and is particularly directed to a closed cell foam insert disposed between the king pin and knuckle arm.

2. Description of the Prior Art

Numerous kingpin knuckle arms assemblies exists in the prior art. U.S. Pat. No. 5,213,352 to Chalin discloses a kingpin steering axle assembly comprising an axle, knuckle arm, a king pin pivotally connected to the axle and knuckle arm and an upper cap with a grease fitting retaining the king pin within the knuckle arm. A thrust bearing is disposed between the king pin and the knuckle arm to reduce friction and wear. Each of U.S. Pat. Nos. 3,542,392; 3,441,288 and 2,916,295 disclose variations of conventional steering knuckle mechanisms. Each of the aforementioned U.S. patents are incorporated herein by reference.

The steering knuckle king pin arrangements of the prior art suffer from the drawback in that the king pin is allowed some degree of axial displacement. Such displacement relative to the knuckle arm causes a change in volume in air/grease volume between the kingpin and kingpin cap or bottom of the knuckle arm. These volume changes created negative and positive pressure fluctuations that act as a pumping mechanism to expel grease and ingest water and other contamination from the kingpin-to-knuckle sealing interface. The object of the present invention, therefore, is to alleviate the drawbacks of the prior art and prevent pressure fluctuations in the void space between the kingpin and kingpin cap and or bottom recess portion of the knuckle arm.

SUMMARY OF THE INVENTION

The present invention is directed to a closed cell foam insert disposed between the kingpin and kingpin cap or bottom recess portion of the knuckle arm. A king pin is connected between a vehicle steering axle and a knuckle arm. The king pins are pivotally connected to either ends of an axle beam and pivotally connected to steering knuckles which in turn are connected to the wheels. Each king pin is rotatably mounted within a cylindrical bore on the steering knuckle and retained therein by a king pin cap disposed adjacent at least one end. A closed cell foam insert is disposed between the king pin and king pin cap to occupy the space therebetween. The insert is preferably axially compressed so that it may further compress or expand to substantially or completely occupy the volume between the kingpin and king pin cap or bottom surface of the knuckle arm bore. A grease fitting may be formed on the king pin cap and a grease passage formed between the insert and king pin cap to facilitate lubrication.

DETAILED DESCRIPTION OF THE INVENTION

Figure 1:
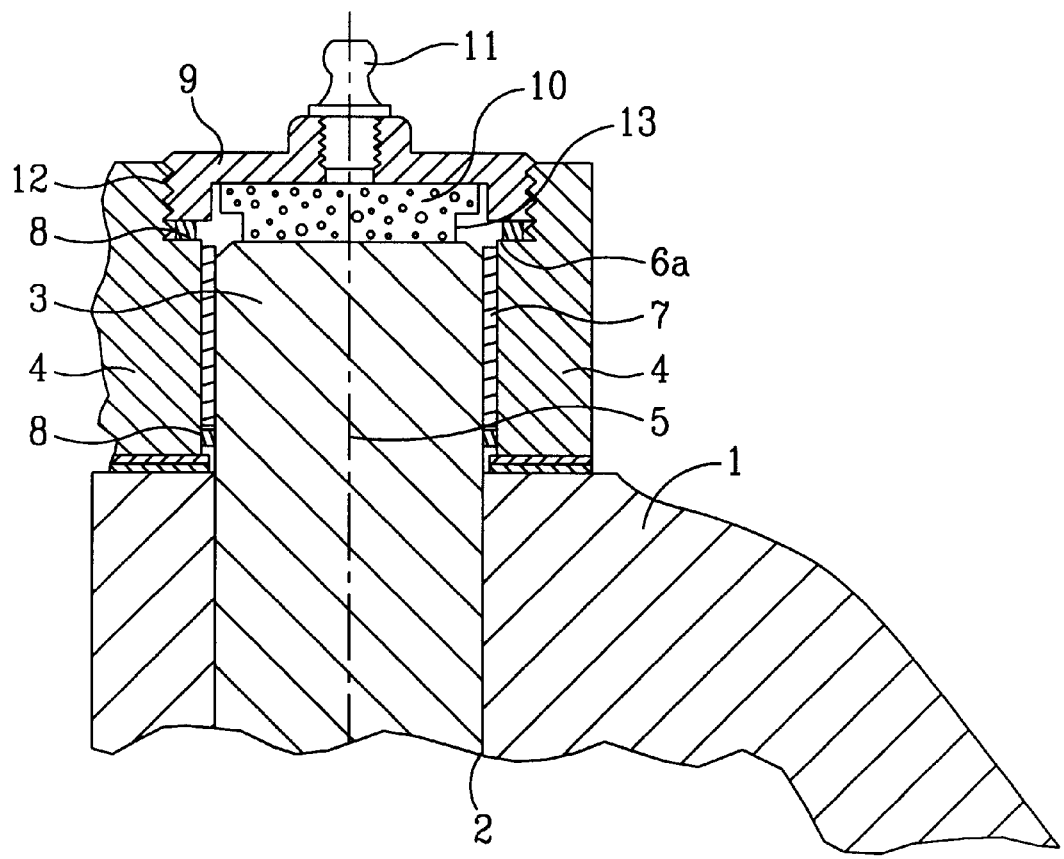
FIG. 1 is a partial sectional view of the steering knuckle kingpin arrangement according to the present invention.
Figure 2:
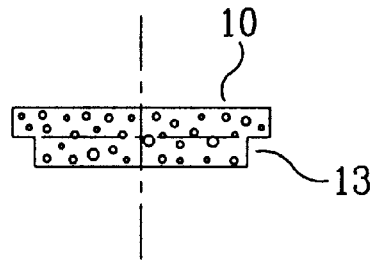
FIG. 2 is a cross sectional view of the closed cell insert according to the present invention.
Figure 3:
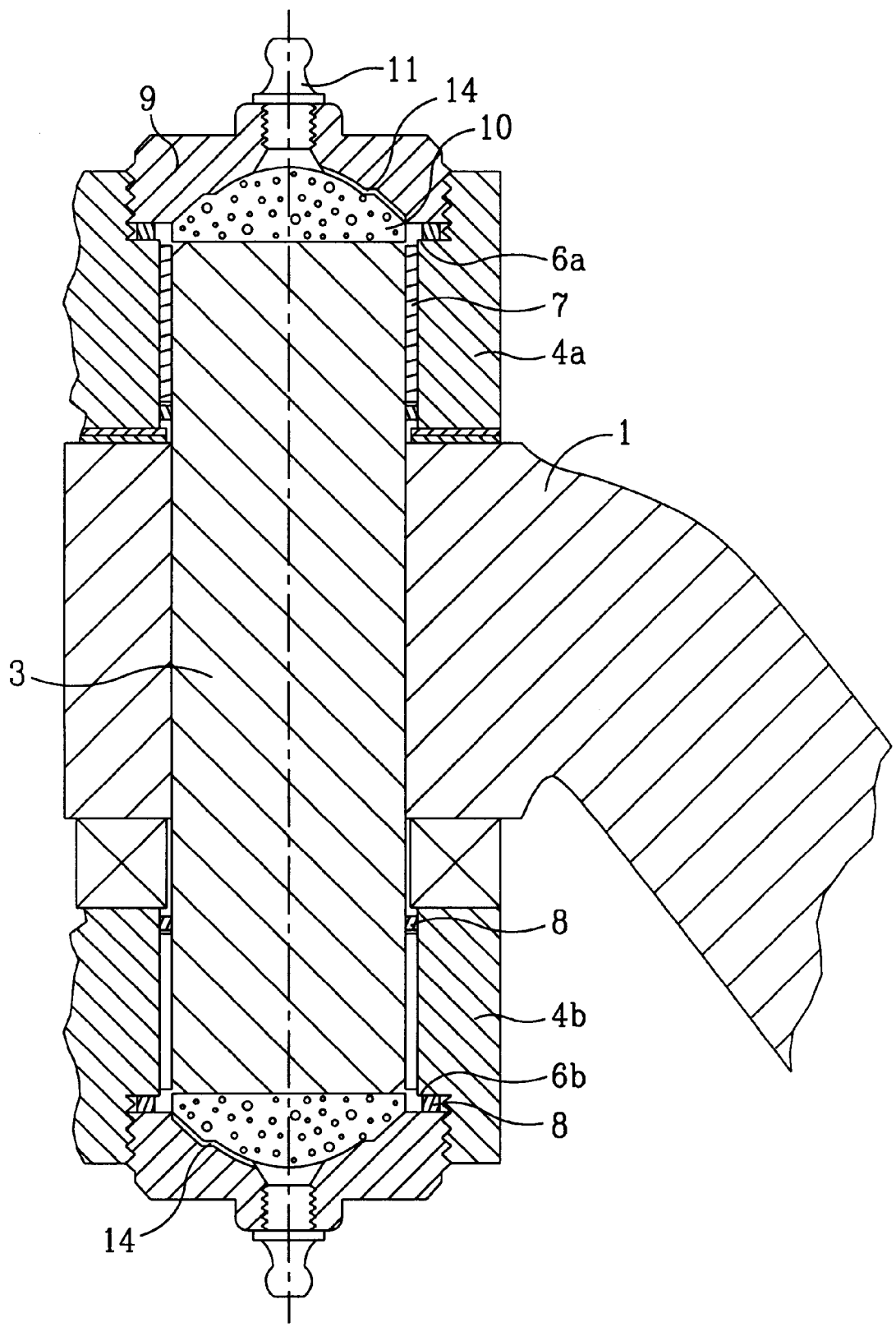
FIG. 3. is a partial cross section view of a steering knuckle kingpin arrangement of an alternate embodiment of the present invention.

FIG. 1 depicts a partial cross sectional view of a front axle assembly for a vehicle. (FIG. 3 depicts a lower portion of the front axle assembly not shown in FIG. 1.) A rigid axle beam 1 has a substantially cylindrical bore 2 having a substantially vertical axis 5. The alignment of the cylindrical bore 2 may be slightly angled to provide for camber.

A substantially cylindrical kingpin 3 is disposed within bore 2. A steering knuckle 4 is mounted for pivotal movement about kingpin axis 5. The steering knuckle 4 comprises an outwardly extending wheel bearing spindle (not shown) on which is rotatably mounted a ground engaging wheel (also not shown). The steering knuckle 4 comprises upper and lower yoke arms 4a,4b each having a cylindrical bore 6a,6b for receiving extending end portions of the kingpin 3. A steering arm is connected to the knuckle in a conventional manner to facilitate steering.

The upper ends of the kingpin 3 extend within each bore 6a,6b or knuckle 4 and are rotatably fitted within bushing 7 to facilitate easy relative rotation between the knuckle arm 4 and the axle beam 1. Annular flexible seals 8 are mounted within the bore 6a. A first seal is mounted about the kingpin between the kingpin and knuckle bore. A second seal is mounted between the knuckle bore and a kingpin cap 9. These seals prevent the entry of dust and moisture as well as the egress of grease to protect the bearing surfaces between the kingpin 3, bore 6a,6b of the knuckle 4 and the bushing 7.

At the upper end of bore 6a, a kingpin cap 9 tightly closes the bore by threadingly engaging the knuckle 4. A seal 8 is disposed between the kingpin cap 9 and the knuckle bore to form a tight seal therebetween. A grease fitting 11 is formed on the kingpin cap 9 to permit lubricant to be introduced between the kingpin cap and kingpin for lubricating the bearing surfaces between the kingpin 3, knuckle 4 and bushing 7.

A closed cell foam insert 10 is disposed between the kingpin 3 and the kingpin cap 9 to substantially fill the space therebetween. The insert 10 is preferably slightly compressed to allow expansion and further compression as the kingpin 3 axially translates. The insert 10 serves to eliminate a change in air/grease volume as the kingpin 3 moves axially relative to the knuckle. Such an arrangement prevents positive/negative pressure fluctuations which would otherwise act as a pumping mechanism to expel grease and ingest water and other contamination from around the kingpin-to-knuckle sealing interface. The insert 10 is preferably made in a shape of a disc to substantially fill the space between the kingpin 3 and kingpin cap 9. A notch 13 may be formed in the insert 10 to reduce or eliminate the contact of the insert with the rotating interface between the kingpin 3 and bushing 7 thereby reducing wear.

The closed cell foam insert is easily installed. After the knuckle arm 4, king pin 3, and axle beam 1 are assembled, the insert is placed within bore 6a against the top portion of the kingpin 3. The kingpin cap 9 is then screwed into the threads 12 of the bore 6a of the knuckle arm 4. The kingpin cap 9 is tightened to snugly engage the seal 8 and slightly compress the insert 10. Slight compression of the insert 10 acts to pre-load the insert 10 thereby allowing the insert to expand if the distance between the kingpin 3 and cap 9 increases. The pre-load also counteracts any compression set that occurs to the insert during normal operation. The insert can be used at either end of the kingpin 3 whether or not a second kingpin cap 9 is utilized.

Referring to FIG. 3, a grease passage 14 may be formed between the interface of the kingpin cap 9 and the insert 10 to facilitate the passage of lubricant from the grease fitting 11 to the bearing surfaces between the kingpin 3, knuckle arm 4 and bushing 7. The grease passage may be formed as a groove in either the kingpin cap 9 or the top surface of the insert 10.

The lower end of the knuckle arm is preferably formed as the previously described upper portion of the knuckle arm 4. However, it is noted that a second kingpin cap may be replaced by a solid portion of the knuckle having a closed off recess to receive the bottom extending portion of the king pin. When only one kin pin cap is contemplated, a closed cell foam insert may be placed within the bottom recess of the bottom portion of the knuckle arm between the knuckle arm and the kingpin.

While the foregoing invention has been shown and described with reference to a specific preferred embodiment, it will be understood by those possessing skill in the art that various changes and modifications may be made without departing from the spirit and scope of the invention.

What is claimed is:

1. A steering mechanism comprising:

an axle beam having a substantially vertically aligned bore;

a king pin longitudinally extending through said bore and having upper and lower portions extending from said axle beam;

a knuckle having upper and lower yoke portions each having an aligned bore rotatably disposed about a corresponding one of said upper and lower extending portions of said king pin thereby establishing a rotatable connection between said knuckle and said axle beam;

a closure means for closing each of said aligned bores of said yoke portions of said knuckle and retaining said kingpin therewithin; and at least one insert longitudinally disposed between said kingpin and one of said closure means to substantially occupy a space therebetween, said insert engaging an inner surface of said closure means and a longitudinal end of said kingpin, said insert being compressed under a pre-load thereby adapted to expand and further compress to continuously reduce pressure fluctuations caused by axial movement of said kingpin relative to said knuckle.

2. The steering mechanism according to claim 1, wherein said closure means comprises at least one kingpin cap removably secured to one of said yoke portions to close off a corresponding bore.

3. The steering mechanism according to claim 2, wherein said kingpin cap further comprises a grease fitting adapted to introduce lubricant into said corresponding bore.

4. The steering mechanism according to claim 3, wherein said at least one insert is disposed between said kingpin and said kingpin cap, wherein a grease passage is formed along an interface between said insert and said kingpin cap to facilitate distribution of said lubricant to a second interface between said knuckle and said kingpin.

5. The steering mechanism according to claim 1, wherein said at least one insert is made of a closed cell foam.

6. A steering mechanism comprising:

an axle beam having a substantially vertically aligned bore;

a king pin longitudinally extending through said bore and having upper and lower portions extending from said axle beam;

a knuckle having upper and lower yoke portions each having an aligned bore rotatably disposed about a corresponding one of said upper and lower extending portions of said king pin thereby establishing a rotatable connection between said knuckle and said axle beam;

a closure means for closing each of said aligned bores of said yoke portions of said knuckle and retaining said kingpin therewithin; and at least one insert longitudinally disposed between said kingpin and one of said closure means to substantially occupy a space therebetween; wherein said at least one insert is made of a closed cell foam, and said insert being compressed under a pre-load thereby adapted to expand and further compress to continuously reduce pressure fluctuations caused by axial movement of said kingpin relative to said knuckle; wherein said closure means comprises a pair of kingpin caps one each removably secured to each of said yoke portions to correspondingly close off each of said bores; each of said kingpin caps having a grease fitting to introduce lubricant into said bores; and said at least one insert comprises two inserts one each disposed between said kingpin and each of said kingpin caps and having a grease passage formed in an interface between each of said kingpin caps and said insert.

* * * * *